United States Patent
Patel et al.

(10) Patent No.: US 8,635,415 B2
(45) Date of Patent: Jan. 21, 2014

(54) MANAGING AND IMPLEMENTING METADATA IN CENTRAL PROCESSING UNIT USING REGISTER EXTENSIONS

(75) Inventors: Baiju V. Patel, Portland, OR (US); Rajeev Gopalakrishna, Hillsboro, OR (US); Andrew F. Glew, Hillsboro, OR (US); Robert J. Kushlis, Worcester, MA (US); Don Alan Van Dyke, Rescue, CA (US); Joseph Frank Cihula, Hillsboro, OR (US); Asit K. Mallick, Saratoga, CA (US); James B. Crossland, Banks, OR (US); Gilbert Neiger, Portland, OR (US); Scott Dion Rodgers, Hillsboro, OR (US); Martin Guy Dixon, Portland, OR (US); Mark Jay Charney, Lexington, MA (US); Jacob (Koby) Gottlieb, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 642 days.

(21) Appl. No.: 12/571,269

(22) Filed: Sep. 30, 2009

(65) Prior Publication Data

US 2011/0078389 A1 Mar. 31, 2011

(51) Int. Cl.
*G06F 12/02* (2006.01)
*G06F 9/302* (2006.01)

(52) U.S. Cl.
USPC .................. 711/154; 711/201; 711/E12.002; 712/221; 712/225; 712/E9.017

(58) Field of Classification Search
None
See application file for complete search history.

(56) References Cited

U.S. PATENT DOCUMENTS

2006/0155911 A1* 7/2006 Gheith et al. ............... 711/5
2010/0042808 A1* 2/2010 Moyer ........................ 712/22
2010/0174893 A1* 7/2010 Rivera ...................... 712/244

OTHER PUBLICATIONS

Necula, G., et al., "CCured: Type-Safe Retrofitting of Legacy Code", In the Proceedings of the 29th ACM Symposium on Principles of Programming Languages (POPL02), London, England, Jan. 2002, 12 pages.
Condit, J., et al., "CCured in the Real World", In the Proceedings of the ACM SIGPLAN 2003 Conference on Programming Language Design and Implementation (PLDI03), San Diego, California, Jun. 2003, 13 pages.
Necula, G.C., et al., "CCured: Type-Safe Retrofitting of Legacy Software", In ACM Transactions on Programming Languages and Systems (TOPLAS), vol. 27, No. 3, May 2005, 48 pages.
Cowan, C., et al., "StackGuard: automatic adaptive detection and prevention of buffer-overflow attacks", In the Proceedings of the 7th conference on USENIX Security Symposium, San Antonio, Texas, Jan. 1998, 16 pages.
Cowan, C., et al., "PointGuardTM: protecting pointers from buffer overflow vulnerabilities", In the Proceedings of the 12th conference on USENIX Security Symposium, Washington, DC, Aug. 2003, 13 pages.
Cowan, C., et al., "Buffer Overflows: Attacks and Defenses for the Vulnerability of the Decade", DARPA Information Survivability Conference and Expo (DISCEX), Hilton Head Island, South Carolina, Jan. 2000, 11 pages.

(Continued)

*Primary Examiner* — Denise Tran
(74) *Attorney, Agent, or Firm* — Blakely, Sokoloff, Taylor & Zafman LLP (57) ABSTRACT

A set of default registers of a processor are expanded into metadata registers on the processor of a computer system. The default registers having stored thereon data, while metadata which is related to the data is stored separately on the metadata registers.

13 Claims, 7 Drawing Sheets

(56) References Cited

OTHER PUBLICATIONS

Austin, T.M., et al., "Efficient detection of all pointer and array access errors", SIGPLAN Notices, vol. 29, No. 6, Jun. 1994, pp. 290-301.
Hastings, R., et al., "Purify: Fast detection of memory leaks and access errors", In the Proceedings of USENIX Winter 1992 Technical Conference, Berkeley, California, Jan. 1991, pp. 125-138.
Jim, T., et al., "Cyclone: A Safe Dialect of C", In the Proceedings of the General Track of the annual conference on USENIX Annual Technical Conference, Monterey, California, Jun. 2002, pp. 275-288.
Jones, R.W.M., et al., "Backwards-compatible bounds checking for arrays and pointers in C programs", AADEBUG, Linkoping, Sweden, May 1997, 14 pages.
Patil, H., et al., "Low-cost, concurrent checking of pointer and array accesses in C programs", Software—Practice and Experience, vol. 27, No. 1, Jan. 1997, pp. 87-110.
Dhurjati, D., et al., "Backwards-compatible array bounds checking for C with very low overhead", In the Proceedings of the 28th International Conference on Software Engineering (ICSE 06), Shanghai, China, May 2006, 10 pages.
Xu, W., et al., "An efficient and backwards-compatible transformation to ensure memory safety of C programs", ACM SIGSOFT Software Engineering Notes, vol. 29, No. 6, Nov. 2004, pp. 117-126.
Bodik, R., et al., "ABCD: eliminating array bounds checks on demand", In the Proceedings of the ACM SIGPLAN 2000 conference on Programming language design and implementation, Vancouver, British Columbia, Jun. 2000, pp. 321-333.
Ganapathy, V., et al., "Buffer overrun detection using linear programming and static analysis", In the Proceedings of the 10th ACM confrence on Computer and communications security, Washington, DC, Oct. 2003.
Larochelle, D., et al., "Statically detecting likely buffer overflow vulnerabilities", In the Proceedings of the 10th conference on USENIX Security Symposium (SSYM 01), Washington, DC, Aug. 2001, 14 pages.
Wagner, D., et al., "A First Step Towards Automated Detection of Buffer Overrun Vulnerabilities", Network and Distributed System Security Symposium, 15 pages.
Avijit, K., et al., "TIED, LibsafePlus: tools for runtime buffer overflow protection", In the Proceedings of the 13th conference on USENIX Security Symposium (SSYM 04), San Diego, California, Aug. 2004, 13 pages.
Bhatkar, S., et al., "Address obfuscation: an efficient approach to combat a board range of memory error exploits", In the Proceedings of the 12th conference on USENIX Security Symposium, Washington, DC, Aug. 2004, 17 pages.
Kc, G.S., et al., "Countering code-injection attacks with instruction-set randomization", In the Proceedings of the 10th ACM conference on Computer and communications security (CCS 03), Washington, DC, Oct. 2003, 9 pages.
Sovarel, A.N., et al., "Where's the FEEB? the effectiveness of instruction set randomization", In the Proceedings of the 14th conference on USENIX Security Symposium (SSYM 05), Baltimore, Maryland, Jul. 2005, 16 pages.
Barrantes, E.G., et al., "Randomized instruction set emulation to disrupt binary code injection attacks", In the Proceedings of the 10th ACM conference on Computer and communications security, Washington, DC, Oct. 2003, pp. 281-289.
Shacham, H., et al., "On the effectiveness of address-space randomization", In the Proceedings of the 11th ACM conference on Computer and communications Security, Washington, DC, Oct. 2004, pp. 298-307.
Chen, S., et al., "Non-control-data attacks are realistic threats", in the Proceedings of the 14th conference on USENIX Security Symposium, Baltimore, Maryland, Jul. 2005, 15 pages.
Xie, Y., et al., "ARCHER: using symbolic, path-sensitive analysis to detect memory access errors", In the Proceedings of the 9th European software engineering conference held jointly with the 11th ACM SIGSOFT international symposium on Foundations of software engineering, Helsinki, Finland, Sep. 2003, pp. 327-336.
Dor, N., et al., "CSSV: towards a realistic tool for statically detecting all buffer overflows in C", In the Proceedings of the ACM SIGPLAN 2003 conference on Programming language design and implementation, San Diego, California, Jun. 2003, pp. 155-167.
Hackett, B., et al., "Modular checking for buffer overflows in the large", In the Proceedings of the 28th international conference on Software engineering, Shanghai, China, May 2006, pp. 232-241.
Zitser, M., et al., "Testing static analysis tools using exploitable buffer overflows from open source code", In the Proceedings of the 12th ACM SIGSOFT international symposium on Foundations of software engineering, Newport Beach, California, Oct. 2004, pp. 97-106.
Aleph One, "Smashing the stack for fun and profit", Phrack Magazine, vol. 49, No. 14, Nov. 1996, accessed at: http://www.phrack.org/issues.html?issue=49&id=14&mode=txt on Nov. 17, 2009, 16 pages.
Nergal, "The advanced return-into-lib(c) exploits (PaX case study)", Phrack Magazine, vol. 58, No. 4, Dec. 2001, accessed at: http://www.phrack.org/issues.html?issue=58&id=4&mode=txt on Nov. 17, 2009, 29 pages.
Klog, "The frame pointer overwrite", Phrack magazine, vol. 55, No. 8, Sep. 1999, accessed at: http://www.phrack.org/issues.html?issue=55&id=8&mode=txt on Nov. 17, 2009, 5 pages.
Blexim, "Basic integer overflows", Phrack Magazine, vol. 60, No. 10, Dec. 2002, accessed at: http://www.phrack.org/issues.html?issue=60&id=10&mode=txt on Nov. 17, 2009, 12 pages.
Dark spyrit, "Win32 buffer overflows (location, exploitation and prevention)", Phrack Magazine, vol. 55, No. 15, Sep. 1999, accessed at: http://www.phrack.org/issues.html?issue=55&id=15&mode=txt on Nov. 17, 2009, 21 pages.
Scacham, H., et al., "The geometry of innocent flesh on the bone: return-into-libc without function calls (on the x86)", In the Proceedings of the 14th ACM conference on Computer and communications security, Alexandria, Virginia, Oct. 2007, pp. 552-561.

\* cited by examiner

MANAGING AND IMPLEMENTING METADATA IN CENTRAL PROCESSING UNIT USING REGISTER EXTENSIONS

FIELD

The field relates generally to the computing sciences and, more particularly, to metadata in central processing unit (CPU).

BACKGROUND

Modern programming languages such as C and C++ do not use metadata. Crucial metadata such as bounds for pointers (e.g., bounds refer to the beginning and ending addresses, i.e., lower and upper bound respectively, of the objects pointed to by a pointer) and data types for objects are not available during the execution of these programming languages, such as C/C++ programs. The lack of such metadata for a running software program often results in incorrect behavior of the program and leads to vulnerabilities. One conventional approach to add metadata is to store it adjacent to the data itself in memory, so that software or hardware can locate it; however, this requires a change in memory layout/Application Binary Interface (ABI). As a result, metadata is only used in a very specialized environment where the complete software is required to be recompiled to adhere to the new modified conventions.

Alternately, software stores the data and metadata in non-adjacent memory locations and further implements a map function to match the data with the corresponding metadata. In this case, the data is loaded into registers, while the corresponding metadata is loaded into other existing registers. Further, the software is required to keep track of the association between the data and the metadata in existing registers and perform the necessary propagation and invalidation of the metadata to keep it in sync with its corresponding data. In this case, when data is passed to functions in register parameters, the corresponding metadata also needs to be passed in registers. This results in lack of transparency and necessitates an extension to the calling convention used. Also, the implementation of this technique is inherently slow because of a high overhead it places on the software and the system, such as added register pressure, additional instructions that are needed for metadata propagation and invalidation, etc., to the point that the technique is not used in practice.

Figure 1:
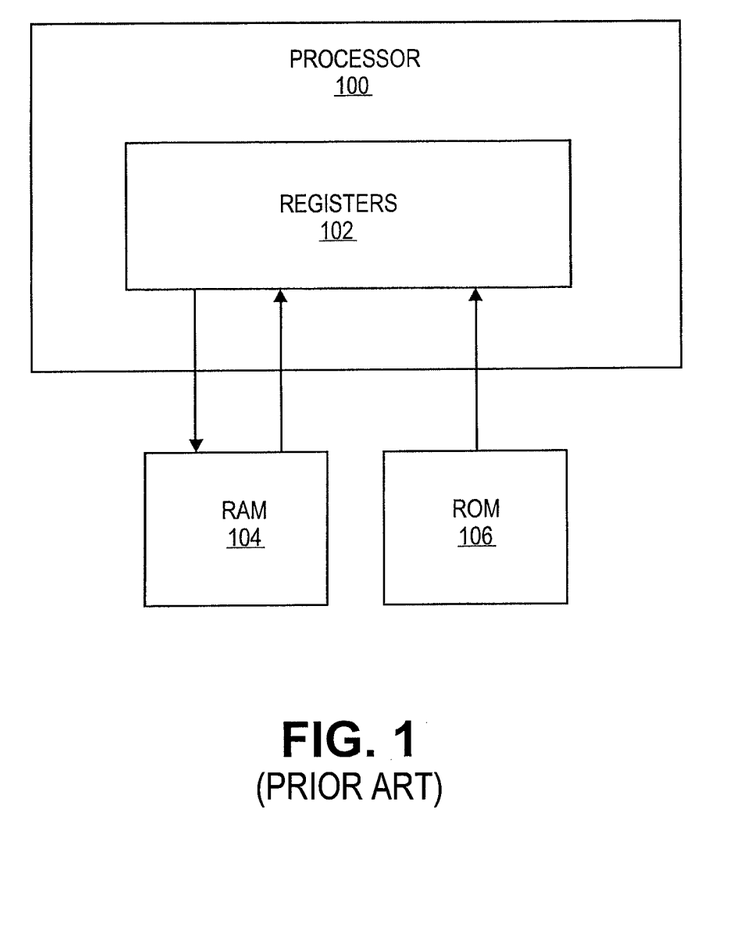
FIG. 1 illustrates a traditional processor having default registers.

FIG. 1 illustrates a simplistic view of a processor 100 having default registers 102. A processor, such as a general purpose processor or a special purpose processor, is a semiconductor chip having electronic circuitry designed to process program code instructions. Most processors typically include a number of common architectural features, such as default registers 102. A typical register provides a small amount of storage space on the processor so certain data can be accessed using the register as opposed to accessing memory which could be a slow process; for example, a register can be used to store instruction input operands and instruction output results.

Other common architectural features may include a cache to locally store instructions and/or data, fetch circuitry to fetch instructions from cache and/or memory, write-back circuitry to store instruction results into cache and/or memory. Further, the processor 100 having registers 102 is shown to be in communication with Random-Access Memory (RAM) 104 and Read-Only Memory (ROM) 106.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Figure 2:
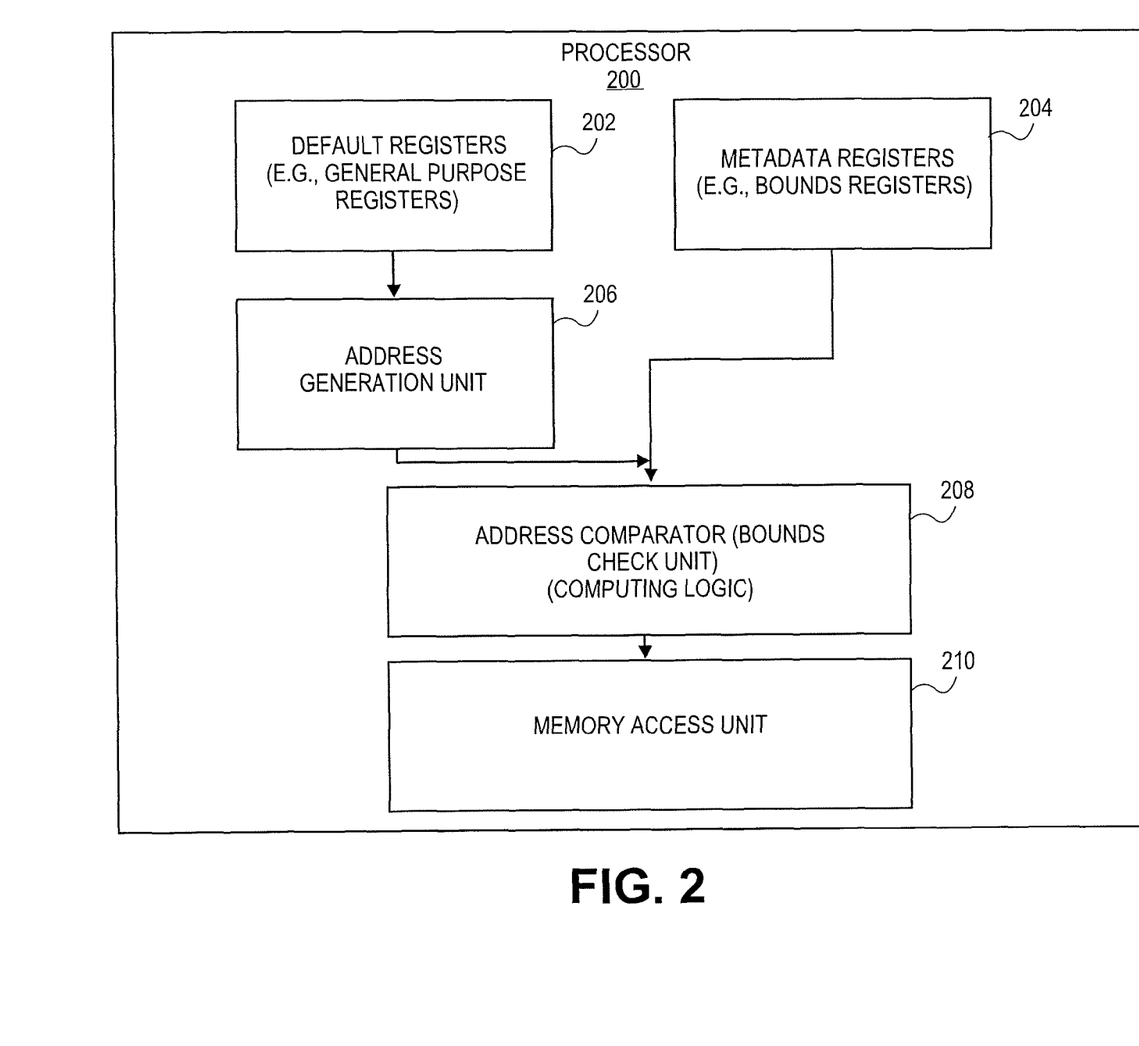
FIG. 2 illustrates an embodiment of a processor having default registers and bound registers.

FIG. 2 illustrates an embodiment of a processor 200 having default (i.e., existing) registers 202 and bound registers 204. In one embodiment, processor 200 is shown to have default registers 202 and bound registers 204 which represent the hardware register extensions of the default registers. These bound registers 204 provide the hardware register extension to hold metadata (e.g., bounds in bound registers 204) and maintain the association of the metadata with its corresponding data (e.g., pointers in default registers 202) when it is copied or modified without the additional pressure on the default registers 202. Also, by providing (implicit or explicit) association between the default registers 202 and the bound registers 204, the calling convention of these registers 202 remains the same. The metadata being held at the bound registers 204 may be used for different purposes by the processor 200. For example, the metadata include data type, and the processor 200 may validate the data type before operating on them.

A register may include a general purpose or integer register (that is used for storing data and addresses and is regarded as a combined data/address register) and other registers, such as a user-accessible register, a data register, an address register, a condition register, a floating point register, a constant register, a vector register, a special purpose register (including an instruction register), a model-specific register, a control and status register, etc. In one embodiment, integer registers are associated with bound registers 204 but the embodiments do not limit bound registers 204 to integer registers and that any type or a combination of types of registers may be employed. The register extensions 204 hold metadata associated with data in the registers 202. In one embodiment, when a (general purpose) register 202 contains a memory address (e.g., a pointer), and the register extension 204 may be used to specify the range of memory addresses that can be accessed (load/store) using register 202. The address in register 202 may be outside the bounds specified in its bound register 204. These bounds may be checked at the time of memory access. Each memory address range consists of a lower bound and an upper bound (further described and discussed later in this document). In this case, the register extension 204 is referred to as bounds register or register descriptor. Processor 200 further includes an address generator unit 206 to generate or determine memory addresses. The address might be generated using register 202 and optionally other registers (e.g., index register in Intel processor and a constant displacement). Processor 200 further includes an address comparator (also referred to as bounds check unit) 208 to compare lower and upper bounds of address ranges, and a memory access unit 210 to provide access to the memory coupled with the processor 200 and storage mediums within the registers 202, 204. As illustrated, the default registers 202 are coupled with the address generator unit 206, while both the address generator unit 206 and the bound registers 204 are coupled with the address comparator (computing logic) 208 which is further coupled with the memory access unit 210. Processor 200 may contain other logics, circuits, and modules to perform various tasks of the embodiments as described throughout this document. Default registers 202, depending on the nature of tasks being performed, may contain any number and type of registers, such as general purpose registers, floating point registers, etc. For example, relating to an instruction, source registers and destination registers are employed and these may include general purpose registers or floating point registers, etc. So, an instruction may be provided through a source register, while the results of the instruction may be placed at a destination register; the source and destination registers being part of the default registers 202.

In one embodiment, a new program instruction is defined to create bounds and store them in the bound registers 204. This program instruction can be an entirely new opcode that was previously undefined in a program, or could also be aliased to using previously unused non-operaton (NOP) instruction. The propagation of metadata to maintain consistency is performed by the processor 200 either implicitly for a subset of instructions that are typically used with pointer manipulation (such as ADD, SUB, INC, DEC, etc) or explicitly using new instructions that indicate propagation behavior. It describes how the processor 200 preserves the metadata when the data it corresponds to is modified in certain conditions as well as how the processor 200 destroys the metadata when the data it corresponds to is modified in other conditions. Because in one embodiment, the semantics of existing instructions are employed to propagate, preserve, and validate/invalidate metadata, there are no additional instructions needed in the software program which can potentially negatively impact the program code size and its performance.

In one embodiment, bound checks are applied to any number of memory instructions and may be explicitly specified via a prefix of an instruction, such as a segment override prefix. When an instruction has the segment override prefix which is the same as its default segment, the instruction may enforce the bound check while, in another embodiment, a completely new prefix may be added to the instruction. The default segment prefix is NOP in those processors that do not implement this technology. The use of NOP prefix allows the software to work correctly without the benefit of metadata on those processors that do not support/implement metadata. In one embodiment, an explicit bounds check instruction may be allowed, where such an instruction would have two or three operands. For example, in a two operand form, the first operand is used as a memory address and the second operand is used as an access size (byte, word etc.).

Figure 3:
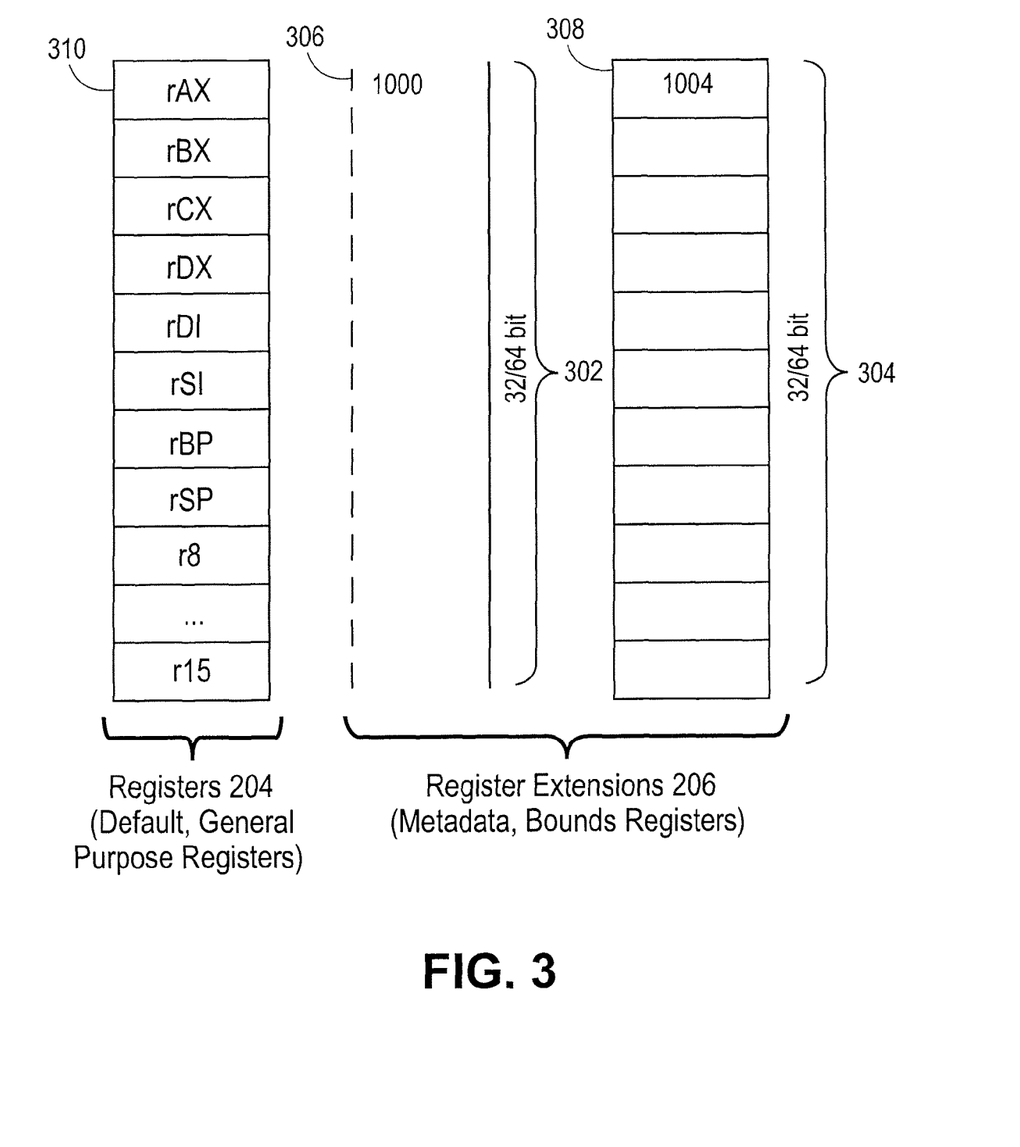
FIG. 3 illustrates an embodiment of default registers coupled with bound registers in a processor.

FIG. 3 illustrates an embodiment of default registers 202 coupled with bound registers 204 in a processor. In one embodiment, register extensions (e.g., bound registers) 204 may include any number and type of registers based on the number and type of default registers 202 as well as on the workings of the processor architecture of the computer system. In this illustration, the register extensions are 128 bits wide with the lower bound extensions 302 being 64 bits wide to hold lower bounds and the upper bound extensions 304 being 64 bits wide to hold upper bounds.

For example, a new instruction, e.g., CPMKDSC r, m, takes a register and an effective address as operands. The register value is the lower bound and the effective address is the upper bound. The instruction writes the lower bound value to the lower bound register extension 302 and the upper bound value to the upper bound register extension 304 corresponding to the specified register. So, for example, CPMKDSC RAX, [RBX] where RAX=1000 and RBX=1004, the lower bound extension 306 will be written with 1000 as the lower bound value, while the upper bound extension 308 will be written with 1004 as the upper bound value in RAX's descriptor. This establishes 1000 and 1004 as the lower and upper bounds for the pointer in RAX. In another embodiment, the instruction can have three operands to calculate lower bound and upper bound, while, in yet another embodiment, there can be two separate instructions to generate the lower and upper bound separately.

Instructions that may be used to perform arithmetic operations on pointers such as INC, DEC, AND, OR, ADD, and SUB preserve the descriptor contents of the register used in the operation. These operations modify the pointer value but do not destroy it which is why the descriptor contents are still valid. Continuing with the above example, if INC RAX is executed five times then the value of RAX will be 1005 and let's say RAX is now used to access memory using MOV RCX, [RAX]. The metadata associated with the pointer in RAX are the lower and upper bounds namely 1000 306 and 1004 308. This information when matched against RAX being 1005 concludes that an out-of-bounds memory access, i.e. a buffer overflow, is detected. In this embodiment, the CPU/processor may signal a buffer overflow exception so that the programming software can take appropriate corrective actions.

Instructions such as MOV or LEA are used to copy pointers between registers and are used to propagate contents of a source descriptor to a destination descriptor in addition to copying pointers. This corresponds to copying the bounds in the bound registers 204 when pointers are copied between registers in the default registers 202. Any other instruction that does not require or expect metadata may invalidate or destroy the descriptor contents of any destination registers used in instructions; for example, MOV RAX, 0 destroys the descriptor contents of RAX because bounds may be meaningful for pointers and not for integers.

In one embodiment, software or hardware or a combination of the two may be used to assert a fine grain access control to memory. Access control, in general, refers to the checks performed when various subjects access objects in making sure that any subjects attempting to access objects have permissions to access such objects. For example, pointers can be regarded as the subjects trying to access different objects in memory. Permissions are embodied as bounds associated with the pointer. Access control information is herein referred to as (lower/upper) bound information or values, while access control check is referred to as bounds check. Bound registers 204 and any methods specified here may perform certain tasks or checks, such as lower/upper bounds checking, when accessing memory using a pointer. These methods may also perform additional checks, such checks of permissions and/or data types. In one embodiment, bound registers 204 are used to specify lower/upper bound values for an address to be used to access memory, enforce the specified bound values, and handle any bound violations.

In one embodiment, bound registers 204 and methods are used to specify bound values (also referred to as access control information) for pointers, manipulate pointers and/or bound values, as necessary, and enforce bound values as part of memory access. A novel fine grain access control or bounds check technique using bounds registers 204 is employed. The method/apparatus/system employed here directly associates bound values to pointers or pointer values (as opposed to having controls in page table or segment registers) that assert access control for a memory region as opposed to the data objects in the general purpose (e.g., integer) registers 202 to facilitate fine grain bound checks of bound values stored in the bound registers 204.

As aforementioned, in one embodiment, one or more existing (but unused) instructions of a program may be used to generate and specify bound values (access control information), and to associate bound values to pointers in the default registers 202, and instructions/prefixes are further used to indicate the processor 200 of the enforcement requirements for specific memory access. For example, the default registers 202 may include general purpose (integer) registers to be extended to hold bound values including lower and upper bounds on the address to be accessed using pointers contained in the default registers 202. Each default register 202 is augmented into two additional registers illustrated as bound registers 204 to hold lower and upper bound values for the pointer in a default register 202.

When a default (integer) register 202 with a valid descriptor is used to access memory, the processor 200 enforces bounds in the descriptor against the memory address being accessed. The processor 200 may then add the operand size to the pointer in the default register 202 to check against the specified upper bound. For example, if the access was four bytes, the processor 200 may add 4 to the pointer and compare that number against specified the upper bound. Hence, for bound checking, the operand size is one of implicit operand that is used to check bounds. For example, a bound value may be specified in the base register of a processor-architecture's addressing mode; however, the bound may also be specified in an index register.

In order to ensure interoperability and compatibility with the existing ABIs the legacy instructions may invalidate the bounds associated with destination registers according to one embodiment. In another embodiment, where interoperability may not be required, those instructions are selected for which bounds are not applicable and the bounds (or metadata) may be invalidated for bounds registers 204 associated with destination registers. Also, any instruction that needs to propagate bound values from a specific source register to a specific destination register may add a propagation prefix to the instruction. This way, the embodiments provide a fine grain control over bound values, and also the processor 200 gets to ensure that any legacy instructions clear descriptors to prevent dangling descriptors. However, in other embodiments, where this interoperability or compatibility may not be necessary, these conditions can be relaxed or ignored.

In one embodiment, bound checks are applied to any number of memory instructions and may be explicitly specified via a prefix of an instruction, such as a segment override prefix. When an instruction has the segment override prefix which is the same as its default segment, the instruction may enforce the bound check while, in another embodiment, a completely new prefix may be added to the instruction. In one embodiment, an explicit bounds check instruction may be allowed, where such an instruction would have two or three operands. In a two operand form, the first operand is used as a memory address and the second operand is used as an access size (byte, word etc.). Bounds from the base or index register of the memory address are used for the check. In a three operand form, a particular bound register of the bound registers 204 may also be explicitly specified along with the contents of the first two operands. Using the technique described in this figure, operations such as preventing buffer overflow, runtime type checking of code (e.g., C/C++ code, etc.) may be performed.

Figure 4:
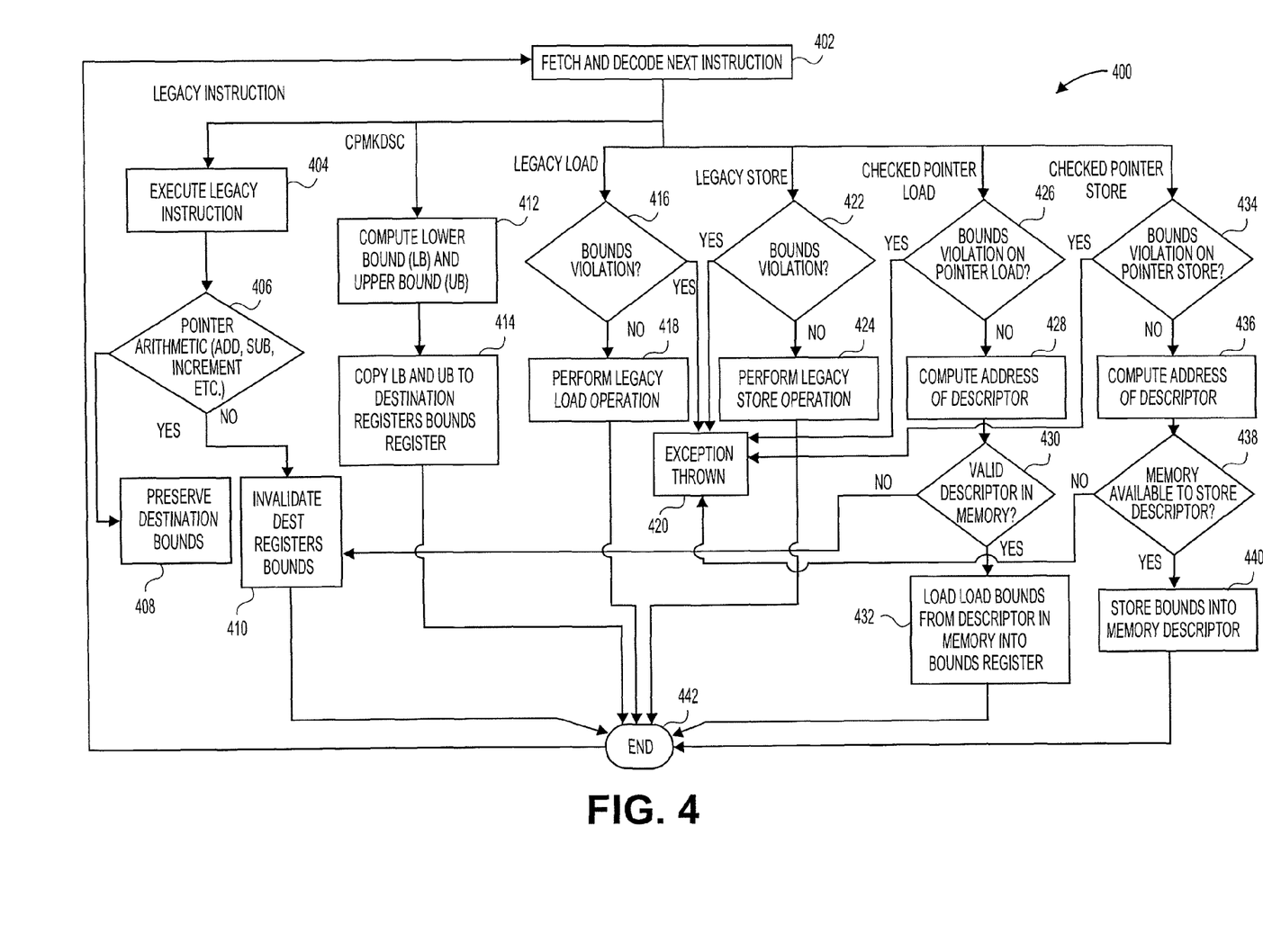
FIG. 4 illustrates an embodiment of a process for managing metadata using bound registers as extension registers of default registers having data associated with the metadata.

FIG. 4 illustrates an embodiment of a process 400 for managing metadata using bound registers as extension registers of default registers. At processing block 402, an instruction of a software program is fetched and decoded in a default register at a processor and if the instruction is a legacy instruction, the legacy instruction is executed at processing block 404. At processing block 406, pointer arithmetic is performed (e.g., adding, subtracting, incrementing, etc.) and the upper and lower bounds of the pointer contained in the default register are preserved in the bounds register that is an extension register of the default register at processing block 408. If the legacy instruction is not a pointer arithmetic instruction, the bounds are invalidated at processing block 410.

If the instruction is CMPKDSC, lower and upper bounds of the address to be accessed using a pointer contained in a default register are computed at processing block 412 and these bounds are then copied to a bounds register at processing block 414. If the instruction relates to legacy load, at decision block 416, a determination is made as to whether there has been a bounds violation on legacy load. If yes, an exception is thrown at processing block 420 and if not, a legacy load operation is performed at processing block 418. Similarly, if the instruction relates to legacy store, at decision block 422, a determination is made as to whether there has been a bounds violation on legacy store. If yes, an exception is thrown at processing block 420 and if not, a legacy store operation is performed at processing block 424.

If the instruction relates to checked pointer (e.g., a pointer which may have bounds associated with it) load, at decision block 426, a determination is made as to whether there has been a bounds violation on pointer load. If yes, an exception is signaled at processing block 420 and if not, an address is computed for the descriptor in memory at processing block 428. At decision block 430, a determination is made as to whether there are valid bounds of the address in the memory. If yes, the valid bounds from memory for the default register are copied to the bounds register serving as an extension of the default register at processing block 432. If not, the bounds are regarded as invalid at processing block 410.

Similarly, if the instruction being fetched and decoded at processing block 402 relates to checked pointer store, at decision block 434, a determination is made as to whether there has been a bounds violation on the pointer store. If yes, an exception is signaled at processing block 420 and if not, an address for the descriptor in memory is computed at processing block 436. At decision block 438, a determination is made as to whether there is any memory available to store bounds of the address. If not, an exception is signaled at processing block 420 and if yes, the bounds are stored from the bound register to the memory descriptor at processing block 440. The processes (from processing blocks 410, 414, 418, 424, 432, 440) end at transition block 442.

Figure 5:
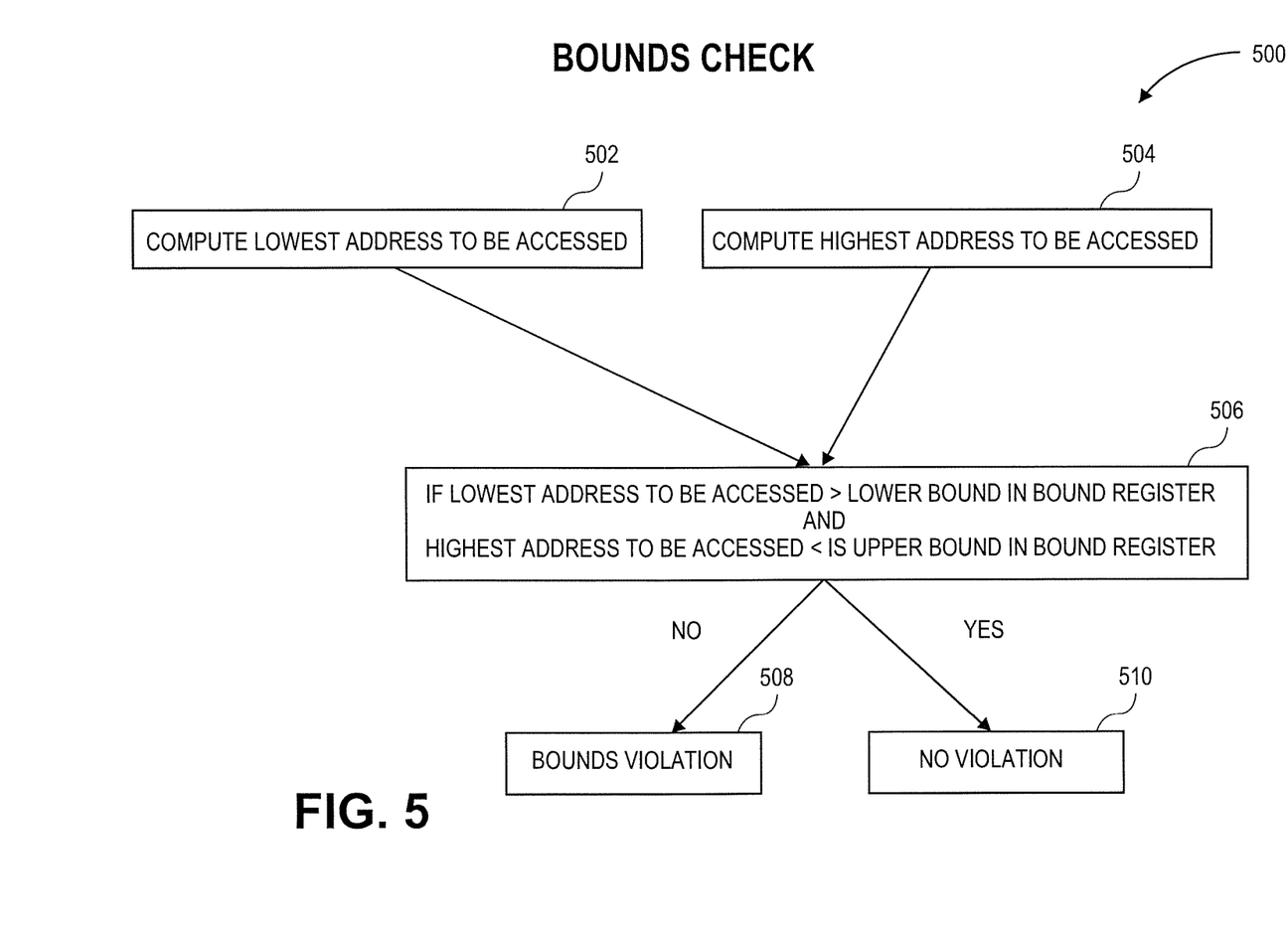
FIG. 5 illustrates an embodiment of a process for bound check.

FIG. 5 illustrates an embodiment of a process 500 for bound check. At processing block 502, the lowest address to be accessed is computed using an available instruction of a software program. At processing block 504, the highest address to be accessed is computed. At processing block 506, a calculation is performed. The calculation determines if the lowest address to be accessed is greater than or equal to the lower bound provided in the bounds register and if the highest address to be accessed is lower than or equal to the upper bound in the bounds register; if so, no violation is detected at processing block 510. If not, a bounds violation is detected and the process ends at processing block 508.

Figure 6:
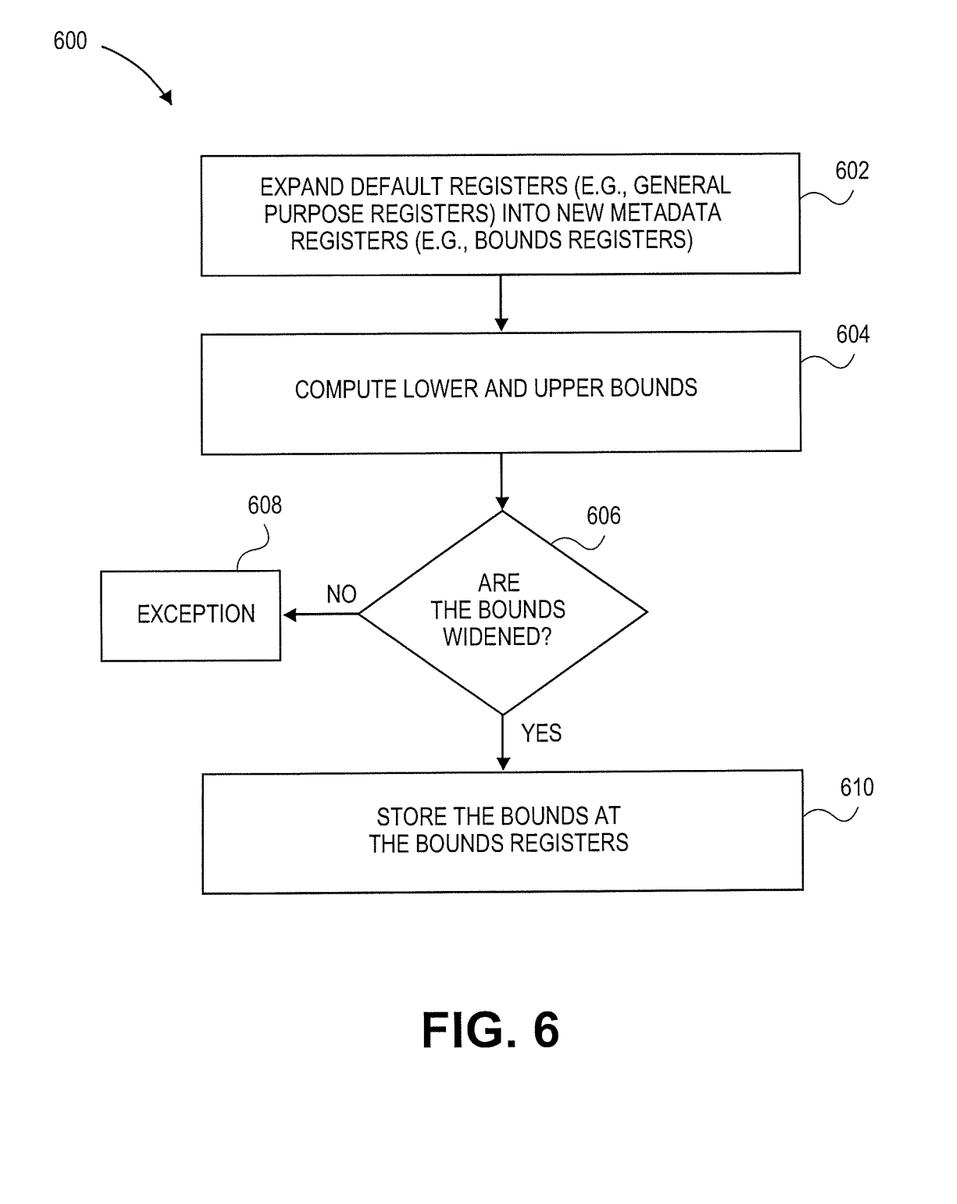
FIG. 6 illustrates an embodiment of a process for managing metadata using bound registers as extension registers of default registers having data associated with the metadata.

FIG. 6 illustrates an embodiment of a process 600 for managing metadata using bound registers as extension registers of default registers having data associated with the metadata. At processing block 602, a set of bounds register is added to the process that already has a set of default registers. A default register may include a general purpose (integer) register and be used to hold data, pointers, etc. The set of bounds registers may include (hardware-based) registers which are capable of holding metadata (such as bounds) relating to the data present in the default registers. In one embodiment, for each default register two bounds registers are added to the processor such that one of them holds a lower bound and the other holds an upper bound corresponding to the address being used by a pointer in the default register to access memory. At processing block 604, computation of the lower and upper bounds associated with an address is performed using computation logic at the processor using one or more instructions of a software program that are available but unused.

At decision block 606, using the computation logic, a determination is made as to whether the computed bounds are valid. In one embodiment, the computed bounds are violated if the computed lower bound is lesser than the lower bound already present in the bounds register or if the computed upper bound is greater than the upper bound already present in the bounds registers. This is referred to as widening of the bounds. If the bounds are determined to be widened, an exception is thrown at processing block 608 and the bounds are not stored in the bounds registers. If, however, the bounds are not widened, they are stored in the lower and upper bounds registers at processor block 610.

Embodiments of the present invention include providing new/extension registers of default (general purpose) registers such that the extension registers to hold metadata, using an instruction to create metadata in the extension resisters, load/store metadata from/to memory into the extension registers, checking of memory access against metadata, performing invalidation of metadata by those instructions that do not support metadata for results, and providing implicit association of metadata with default registers. Further, performing instruction encoding using previously implemented NOPs for the new instructions which allows for a software program to work correctly on processors that do not implement this invention correctly without the benefit of metadata; while; on the processors that implement the new technology and use metadata, the same software delivers benefits.

Moreover, embodiments of the present invention define metadata that specifies bounds for a pointer in the general purpose register. When a pointer is used to reference memory, the processor computes the range of addresses that are to be accessed by an instruction and compares those addresses against the bounds in extension (bounds) registers to ensure that the memory locations accessed by any of the instructions are entirely within those bounds. Any attempt to access a memory location outside the bounds is prevented and in such a case, the processor signals exception to allow the software program to handle this condition. An embodiment includes an address translation function to translate the address where a pointer is stored to the address where the metadata is to be stored in the memory such that the metadata associated with a memory address can be loaded or stored into the extension registers. This address translation technique allows the metadata to be stored at a location (e.g., new/extension/bounds register) that is apart from the location where the corresponding data is stored (e.g., default/general purpose register). For brevity, clarity and consistency, "bounds" are used here as an example of what metadata might include (hence, the term "bounds registers"), but it is contemplated that metadata may include any number of corresponding content associated with data. For example, metadata may include any number of data type [<datatype>] (e.g., integer, floating point, etc.) at extension registers relevant to and associated with the corresponding data at default registers. In another embodiment, it is pointer to type table for complex datatypes, such as structures. In other embodiment, the metadata might include memory access rights, such as read only, read/write, etc.

Figure 7:
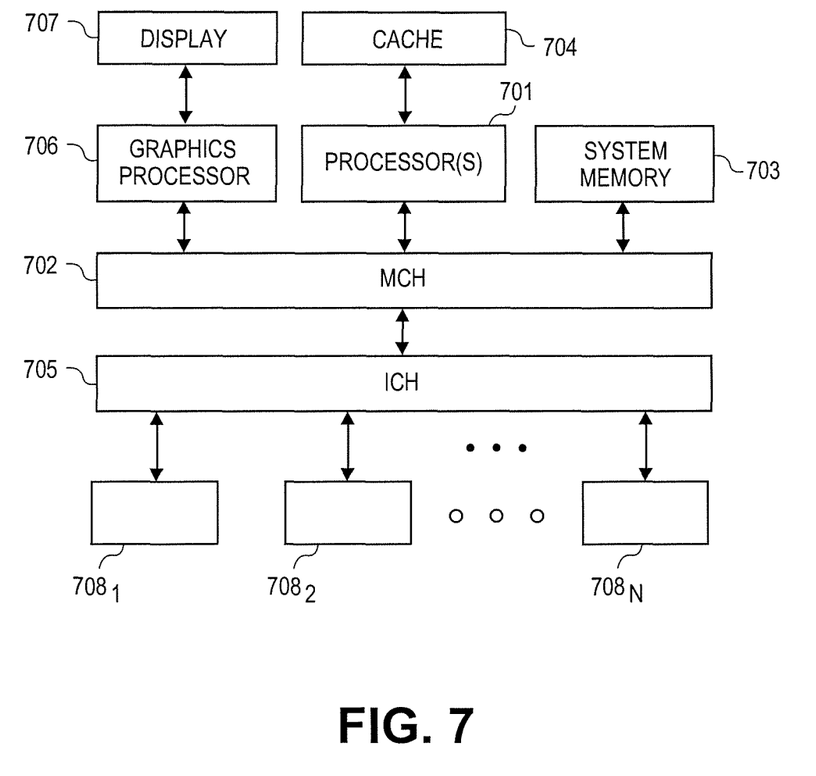
FIG. 7 illustrates an embodiment of a computing system.

FIG. 7 illustrates an embodiment of a computing system (e.g., a computer). The exemplary computing system of FIG. 7 includes: 1) one or more processor 701 at least one of which may include features described above; 2) a memory control hub (MCH) 702; 3) a system memory 703 (of which different types exist such as double data rate RAM (DDR RAM), extended data output RAM (EDO RAM) etc.); 4) a cache 704; 5) an input/output (I/O) control hub (ICH) 705; 6) a graphics processor 706; 7) a display/screen 707 (of which different types exist such as Cathode Ray Tube (CRT), Thin Film Transistor (TFT), Liquid Crystal Display (LCD), DPL, etc.; and 8) one or more I/O devices 708.

The one or more processors 701 execute instructions in order to perform whatever software routines the computing system implements. The instructions frequently involve some sort of operation performed upon data. Both data and instructions are stored in system memory 703 and cache 704. Cache 704 is typically designed to have shorter latency times than system memory 703. For example, cache 704 might be integrated onto the same silicon chip(s) as the processor(s) and/or constructed with faster static RAM (SRAM) cells whilst system memory 703 might be constructed with slower dynamic RAM (DRAM) cells. By tending to store more frequently used instructions and data in the cache 704 as opposed to the system memory 703, the overall performance efficiency of the computing system improves.

System memory 703 is deliberately made available to other components within the computing system. For example, the data received from various interfaces to the computing system (e.g., keyboard and mouse, printer port, Local Area Network (LAN) port, modem port, etc.) or retrieved from an internal storage element of the computer system (e.g., hard disk drive) are often temporarily queued into system memory 703 prior to their being operated upon by the one or more processor(s) 701 in the implementation of a software program. Similarly, data that a software program determines should be sent from the computing system to an outside entity through one of the computing system interfaces, or stored into an internal storage element, is often temporarily queued in system memory 703 prior to its being transmitted or stored.

The ICH 705 is responsible for ensuring that such data is properly passed between the system memory 703 and its appropriate corresponding computing system interface (and internal storage device if the computing system is so designed). The MCH 702 is responsible for managing the various contending requests for system memory 703 access amongst the processor(s) 701, interfaces and internal storage elements that may proximately arise in time with respect to one another.

One or more I/O devices 708 are also implemented in a typical computing system. I/O devices generally are responsible for transferring data to and/or from the computing system (e.g., a networking adapter); or, for large scale non-volatile storage within the computing system (e.g., hard disk drive). ICH 705 has bi-directional point-to-point links between itself and the observed I/O devices 708.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

We claim:

1. A method comprising:
    storing data into a default register of a first processor of a computer system; and
    separately storing metadata associated with the data stored in the default register into at least one metadata register, wherein each metadata register is a hardware register extension of an associated default register and wherein the metadata includes bounds associated with an address in memory;
    executing a load or store instruction, wherein the load or store instruction is a legacy instruction that does not reference the stored metadata;
    determining if the load or store instruction violates the bounds stored as metadata;
    throwing an exception if the load or store instruction violates the bounds stored as metadata;
    performing the load or store instruction if the load or store instruction does not violate the bounds stored as metadata.

2. The method of claim 1, further comprising:
    computing a lower bound and an upper bound of an address being used by a pointer in a default register to access the memory; and
    storing the lower and upper bounds in a metadata register.

3. The method of claim 1, further comprising performing automatic bounds checking for memory accesses that utilize one or more default registers that are associated with one or more bounds registers that contain one or more of the bounds.

4. The method of claim 1, further comprising associating a prefix to an instruction being used to create and propagate a set of bounds associated with destination registers and using the prefix with existing memory operations to explicitly perform bounds checking of the set of bounds, the prefix including a NOP prefix or a new prefix.

5. The method of claim 1, further comprising executing an instruction including a legacy instruction to perform pointer arithmetic to propagate a set of bounds associated with a source pointer to a destination pointer, wherein the set of bounds are invalidated if the pointer arithmetic is not performed.

6. The method of claim 5, further comprising adding a prefix to the set of bounds being propagated from the source pointer to the destination pointer, wherein the prefix indicates the propagation of the set of bounds from the source pointer to the destination pointer.

7. The method of claim 1, further comprising computing an addresses range associated with memory accesses, and comparing the address range having a lowest address and a highest address relating to a pointer with lower and upper bounds already in the metadata registers to prevent any memory accesses that are outside a bound range of the lower and upper bounds.

8. The method of claim 7, wherein preventing comprises avoiding bounds violation, the bounds violation occurs if the lowest address is lesser than the lower bound already in the metadata registers or the highest address is greater than the upper bound already in the metadata registers.

9. A processor comprising:
    default registers to store data;
    at least one metadata register to store metadata associated with the data stored in the default registers, wherein each metadata register is a hardware register extension of an associated default register and wherein the metadata includes a plurality of bounds associated with an address being used by a pointer representing the data in the default register to access memory; and
    logic to
        execute a load or store instruction, wherein the load or store instruction is a legacy instruction that does not reference the stored metadata,
        determine if the load or store instruction violates the bounds stored as metadata,
        throw an exception if the load or store instruction violates the bounds stored as metadata, and
        perform the load or store instruction if the load or store instruction does not violate the bounds stored as metadata.

10. The processor of claim 9, wherein the metadata includes bounds associated with addresses being used by pointers representing the data in the default registers to access memory, the processor comprising:
    logic to compute a lower bound and an upper bound of an address being used by a pointer in a default register to access the memory.

11. The processor of claim 10, wherein at least two metadata registers correspond to each of the default registers, wherein a first of the at least two metadata registers to store the lower bound and a second of the at least two metadata registers to store the upper bound.

12. A non-transitory machine-readable medium comprising instructions that when executed, cause a machine to:
    store data into a default register of a first processor of a computer system;
    separately store metadata on the metadata registers, associated with the data stored in the default register into at least one metadata register, wherein each metadata register is a hardware register extension of an associated default register and wherein the metadata includes one bounds associated with an address in memory;
    execute a load or store instruction, wherein the load or store instruction is a legacy instruction that does not reference the stored metadata;
    determine if the load or store instruction violates the bounds stored as metadata;
    throw an exception if the load or store instruction violates the bounds stored as metadata;
    perform the load or store instruction if the load or store instruction does not violate the bounds stored as metadata.

13. The non-transitory machine-readable medium of claim 12, wherein the metadata includes bounds associated with addresses being used by pointers representing the data in the default registers to access memory, the instructions that when executed, further cause the machine to:
   compute a lower bound and an upper bound of an address being used by a pointer in a default register to access the memory.

\* \* \* \* \*

UNITED STATES PATENT AND TRADEMARK OFFICE
CERTIFICATE OF CORRECTION

| | | |
|---|---|---|
| PATENT NO. | : 8,635,415 B2 | Page 1 of 1 |
| APPLICATION NO. | : 12/571269 | |
| DATED | : January 21, 2014 | |
| INVENTOR(S) | : Patel et al. | |

It is certified that error appears in the above-identified patent and that said Letters Patent is hereby corrected as shown below:

In the Claims

In column 10, Claim 12, at line 53 after -- includes -- delete "one".

Signed and Sealed this
Twenty-fifth Day of March, 2014

Michelle K. Lee
*Deputy Director of the United States Patent and Trademark Office*